US011813568B2

(12) United States Patent
Hiltunen (10) Patent No.: US 11,813,568 B2
(45) Date of Patent: Nov. 14, 2023

(54) PURIFICATION COMPOSITION, METHOD FOR PRODUCING PURIFICATION COMPOSITION AND METHOD FOR PURIFYING FLUE GAS BY PURIFICATION COMPOSITION

(71) Applicant: Kleener Power Solutions Oy, Vuolijoki (FI)

(72) Inventor: Pekka Hiltunen, Vuolijoki (FI)

(73) Assignee: KLEENER POWER SOLUTIONS OY, Vuolijoki (FI)

( * ) Notice: Subject to any disclaimer, the term of this patent is extended or adjusted under 35 U.S.C. 154(b) by 0 days.

(21) Appl. No.: 17/629,108

(22) PCT Filed: Jun. 15, 2020

(86) PCT No.: PCT/EP2020/066438
§ 371 (c)(1),
(2) Date: Jan. 21, 2022

(87) PCT Pub. No.: WO2021/013432
PCT Pub. Date: Jan. 28, 2021

(65) Prior Publication Data
US 2022/0274058 A1    Sep. 1, 2022

(30) Foreign Application Priority Data
Jul. 23, 2019    (FI) .................................... 20197103

(51) Int. Cl.
*B01D 53/50*    (2006.01)
*B01D 53/54*    (2006.01)
*B01D 53/62*    (2006.01)
*B01D 53/80*    (2006.01)

(52) U.S. Cl.
CPC ............. *B01D 53/80* (2013.01); *B01D 53/50* (2013.01); *B01D 53/54* (2013.01); *B01D 53/62* (2013.01); B01D 2252/103 (2013.01); B01D 2257/302 (2013.01); B01D 2257/404 (2013.01); B01D 2257/504 (2013.01); B01D 2258/0283 (2013.01)

(58) Field of Classification Search
CPC ........ B01D 53/80; B01D 53/50; B01D 53/54; B01D 53/62; B01D 2252/103; B01D 2257/302; B01D 2257/404; B01D 2257/504; B01D 2258/0283; B01D 2252/10; B01D 2251/00; B01J 8/00; B01J 19/00; B01J 20/00; B01J 2220/40
See application file for complete search history.

(56) References Cited

U.S. PATENT DOCUMENTS

| 5,100,633 | A | 3/1992 | Morrison |
| 6,290,921 | B1 | 9/2001 | Kuivalainen et al. |
| 2004/0228788 | A1* | 11/2004 | Nagai .................... B01D 53/80 |
| | | | 423/432 |
| 2008/0182747 | A1* | 7/2008 | Sinha ................... B01J 20/0296 |
| | | | 502/400 |
| 2009/0134070 | A1 | 5/2009 | Abe et al. |
| 2009/0162269 | A1 | 6/2009 | Barger et al. |

FOREIGN PATENT DOCUMENTS

| CN | 100427408 | 10/2008 | |
| CN | 208982172 | 6/2019 | |
| EP | 3 457 052 | 3/2019 | |
| JP | S57(1982)-180477 | 11/1982 | |
| JP | 61-186277 | 8/1986 | |
| JP | H05(1993)-500024 | 1/1994 | |
| JP | 2008-289953 | 12/2008 | |
| KR | 2011 0 091 175 | * 8/2011 | ............... F23G 7/00 |
| WO | 91/02583 | 3/1991 | |

OTHER PUBLICATIONS

International Preliminary Report on Patentability for PCT/EP2020/066438 dated Dec. 20, 2021, 13 pages.
International Search Report and Written Opinion of the ISA for PCT/EP2020/066438 dated Aug. 11, 2020, 13 pages.
Search Report dated Jan. 28, 2020 in corresponding Finnish Application No. 20197103, 3 pages.
Office Action dated Jan. 28, 2020 in corresponding Finnish Application No. 20197103, 6 pages.
Feb. 28, 2023 Office Action issued in Japanese Patent Application No. 2022-504540, pp. 1-4 [translation included].

* cited by examiner

*Primary Examiner* — Timothy C Vanoy
(74) *Attorney, Agent, or Firm* — Nixon & Vanderhye PC (57) ABSTRACT

A purification composition, comprising 50-60% by weight of ash and 40-50% by weight of liquid. A method for producing the purification composition, comprising: measuring an amount of ash, combining the ash and liquid, wherein an amount of the liquid is based on the amount of the ash, adjusting a temperature of the combination of the ash and the liquid by adjusting a temperature of the liquid and mixing the ash and the liquid. A method for purifying a flue gas by the purification composition, comprising: combining the purification composition and vapour to form a chute, adding the chute to the flue gas, adding the purification composition to the flue gas and over-pressuring the flue gas and adding more of the purification composition to the flue gas and under-pressuring the flue gas.

15 Claims, 6 Drawing Sheets

PURIFICATION COMPOSITION, METHOD FOR PRODUCING PURIFICATION COMPOSITION AND METHOD FOR PURIFYING FLUE GAS BY PURIFICATION COMPOSITION

This application is the U.S. national phase of International Application No. PCT/EP2020/066438 filed Jun. 15, 2020 which designated the U.S. and claims priority to FI Patent Application No. 20197103 filed Jul. 23, 2019, the entire contents of each of which are hereby incorporated by reference.

TECHNICAL FIELD

The present invention relates to a field of purification compositions, especially the compositions used for purifying flue gas.

TECHNICAL BACKGROUND

Industrial emissions cause remarkable environmental challenges. Regulations set tight limits for the emissions arising from industry and these regulations are getting tighter all the time. This causes challenges also for purification solutions used for preventing and controlling the emissions of the industry. The known purification solutions are often complex having many drawbacks. Hence, a more sophisticated solution for purifying the emissions arising from the industry is needed.

BRIEF DESCRIPTION

The present invention is defined by the subject matter of the independent claims.

Embodiments are defined in the dependent claims.

The embodiments and features, if any, described in this specification that do not fall under the scope of the independent claims are to be interpreted as examples useful for understanding various embodiments of the invention.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Industrial activities produce a lot of emissions globally causing harm to an environment as well as people living in the environment. Nowadays the emissions are strictly limited by the regulations. The regulations set limits for the emissions allowed to produce by the industry. The limits of the emissions are getting tighter all the time. Flue gas causes a major part of the emissions. The flue gas is often produced by the combustion processes of power plants. Composition of the flue gas depends on what is being burned, a type of a combustion chamber and how the flue gas is processed. The flue gas usually consist of nitrogen, carbon dioxide, water vapor and excess oxygen. It may further comprise a small percentage of a number of pollutants, such as particulate matters, carbon dioxides, nitrogen oxides, and sulfur oxides.

There are a lot of solutions available in a market for the purification of the flue gas. Still there are also many drawbacks in the known solutions. For example, many of the known purification solutions uses hazardous components in the purification process of the flue gas like, for example, a lye (sodium hydroxide). Therefore, more sophisticated solution for purifying the flue gas is needed.

Figure 1:
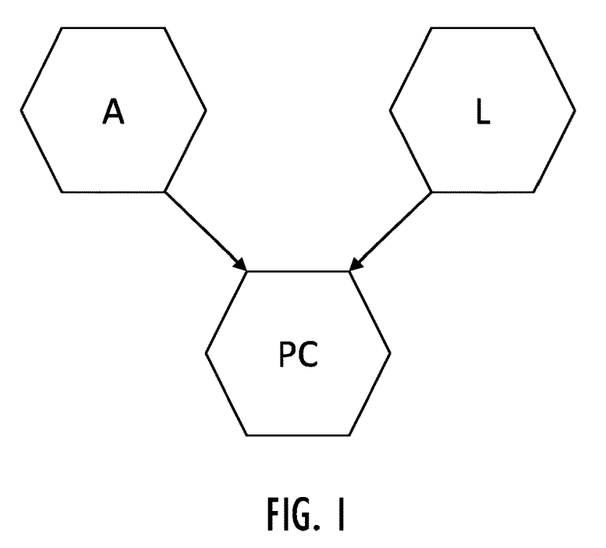
FIG. 1 illustrates a purification composition according to an embodiment of the invention.

Referring to FIG. 1, according to an aspect of the invention, there is provided a purification composition PC comprising 50-60% by weight of ash A and 40-50% by weight of liquid L. The exact amount of the ash and liquid in the purification composition depends on desired properties of the purification composition and therefore it may vary between the given ranges.

In an embodiment, the purification composition comprises at least the ash and liquid wherein an amount of the ash is 50-60% by weight and an amount of the liquid 40-50% by weight. Therefore, the purification composition may comprise up to 10% by weight one or more other components than the ash and liquid. The component refers to other ingredient(s) (matters, substances) that may be used in the composition to get some desired influence. For example, weight of the purification composition may be 100 kg wherein the amount of ash is 55 kg (55%) and amount of the liquid is 45 kg (45%). In another example, the amount of the ash may be 50 kg (50%), amount of the liquid 45 kg (45%) and the purification composition may comprise one or more other components 5 kg (5%).

In an embodiment, the purification composition comprises the ash 54-57% by weight and the liquid 43-46% by weight. Then the purification composition may comprise max 3% by weight one or more other components. This ration of the ash and liquid may be optimal for the purification composition in many situations.

In an embodiment, the purification composition consisting of 50-60% by weight of the ash and 40-50% by weight of the liquid. Then the purification compositions may comprise only the ash and liquid without other components. Still, the liquid may comprise a plurality of components.

In an embodiment, the purification composition consisting of 54-57% by weight of ash and 43-46% by weight of the liquid.

In an embodiment, the ash comprises fly ash. The fly ash may also be called as flue ash or pulverised fuel ash. The fly ash used in the invention may be received from power plants, especially from the power plants using biomaterials as a combustible matter. The fly ash consists of fine particles that are drifting out with the flue gas. The fly ash is normally captured by filtration systems before smokestacks. The fly ash comprises contaminants (heavy metals) like, for example, molybdenum, chromium, arsenic, lead and selenium. Because of the contaminants, the fly ash is not efficiently recycled, instead it often ends up to a dump.

In an embodiment, the ash comprises grate ash or some parts (components) of the grate ash.

The purification composition, according to the invention, may use the fly ash got from the flue gas for purifying the flue gas. In other words, the purification composition is produced, at least partly, from the fly ash received form the flue gas, and is used for purifying the flue gas. Therefore, the process is very simple and effective because the fly ash of the flue gas is recycled and combined with the liquid to form the purification composition used for purifying the flue gas.

In an embodiment, the fly ash is processed during the manufacturing process of the purification composition such that some component(s) of the fly ash is/are removed. For example, contaminants (heavy metals) of the fly ash may be removed and separated such that the finished purification composition may not substantially comprise the contaminants. Hence, only some parts of the fly ash may be used in the finished purification composition and some other part may be separated and removed.

In an embodiment, the liquid comprises water. The liquid may comprise also other components that the water. The liquid may be a combination of the two or more components. The components may be fluids or solid components dissolved into the fluid. The liquid may comprise, for example, limewater. Hence, the liquid may be, for example, a combination of the water and limewater.

In an embodiment, the liquid, combined with the ash, is water.

Figure 2:
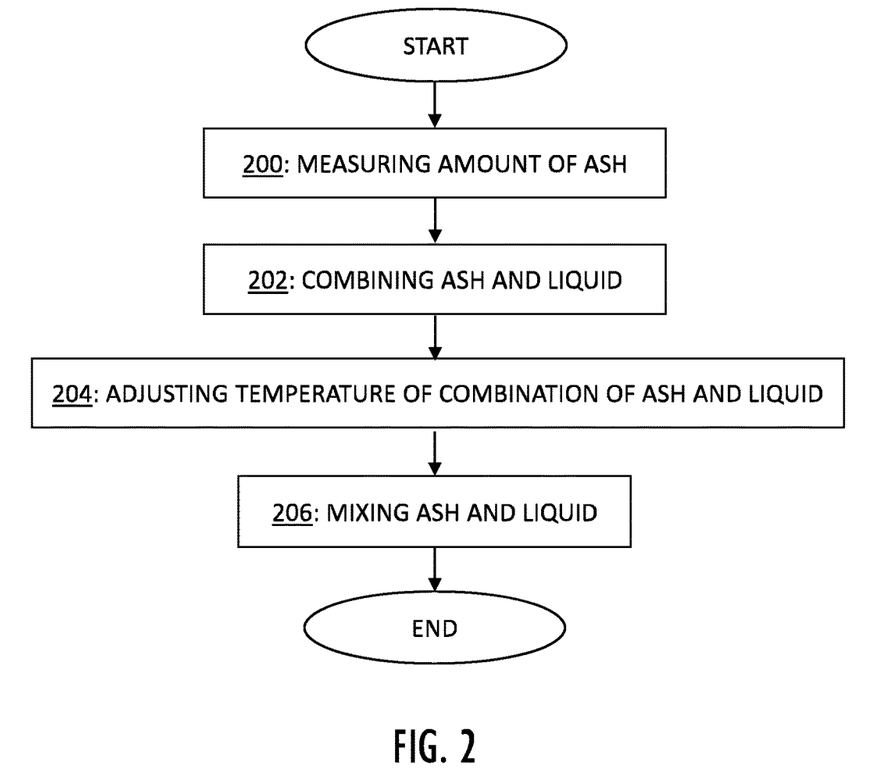
FIG. 2 illustrates a flow chart of a method for producing the purification composition according to an embodiment of the invention.

FIG. 2 illustrates a method for producing of the purification composition according to an embodiment. The method for producing a purification composition comprising: (block 200) measuring an amount of ash, (block 202) combining the ash and liquid wherein an amount of the liquid is based on the amount of the ash, (block 204) adjusting a temperature of the combination of the ash and the liquid by adjusting a temperature of the liquid and (block 206) mixing the ash and the liquid.

A first step in the producing process of the purification composition may be the measurement of the amount of the ash. As described, the purification composition may comprise 50-60% by weight of the ash. The given amount of the ash may be determined based on dry weight, for example. A composition of the ash may affect the weight. For example, if a humidity of the ash is high the ash may weight more. The humidity may be compensated when forming the purification composition. For example, the humidity which already is in the ash may be reduced from the amount of the liquid combined with the ash.

The amount of ash may be used to determine amount of the other components of the purification composition. For example, if the measured amount of the ash is 50 kg, there may be about 50-33 kg other components, like the liquid, in the purification composition.

In an embodiment, a part of the measured ash is combined with the liquid. For example, the amount of the measured ash may be 70 kg, but only 50 kg may be combined with the liquid in the process, then the amount of the liquid combined with the ash is determined based on the 50 kg of the ash. The rest 20 kg of the ash may be used later when producing the purification composition, for example, in the next manufacturing batch.

In a second step, when the amount of the ash is measured, the ash and the liquid may be combined. In other words, the liquid is added to the ash. The amount of the liquid is based on the amount of the ash measured in the first step. The purification composition may comprise 40-50% by weight of the liquid. Referring to the previous example, if the measured amount of the ash is 50 kg, the amount of the liquid going to be added to the ash is about 50-33 kg. There are no other components in addition to the ash and liquid in this example. As described above, the purification composition may also comprise other component(s).

In a third step, the temperature of the combination of the ash and the liquid may be adjusted by adjusting the temperature of the liquid. For example, if the ash is cold the liquid may be warm/hot and respectively if the ash is worm/hot the liquid may be colder. Adjusting of the temperature of the liquid may be performed before combining the ash with liquid and hence, the temperature of the liquid increases/decreases the temperature of the combination of the ash and liquid. There may be temperature limits for the combination of the ash and liquid in which the temperature should be prior to the next step of the process. In an embodiment, the ash and the liquid are combined and after combining, the temperature of the combination is adjusted into the temperature limits. In other words, the combination is heated or cooled after combining the ash and liquid.

In the fourth step, the combined ash and liquid may be mixed after adjusting the temperature of the combination. The purpose of the mixing is to properly mix the combined ash and liquid together. Particles of the combination of the ash and liquid are separated in the mixing process and a chemical reaction may then start. The temperature may be one parameter used to control the above mentioned process. For example, by adjusting the temperature of the combination of the ash and liquid, the properties of the mixing of them may be also be adjusted. For example, the temperature may be used to adjust the separation of the particles that may also affect the chemical reaction. Hence, by adjusting the temperature, the properties of the combination of the ash and liquid (purification composition) may be adjusted.

In an embodiment, the ash and liquid are mixed a predetermined time. In other words, the mixing time of the mixing process is determined beforehand. It may be based on, for example, an amount of the purification composition that is in the mixing process and/or a composition of the combined ash and liquid.

In another embodiment, the purification composition is processed as long as to get desired outcome, in other words, a desired consistency of the purification composition. The composition may be monitored during the mixing process and the processing may be stopped when the desired outcome is achieved. In other words, the mixing time is not predetermined but the combination is mixed until the desired consistency for the purification composition is achieved. In some embodiment, both of the two previous embodiments may be combined such that the predetermined mixing time may be used together with a monitoring of the composition.

In addition to the temperature, the mixing time may be one parameter used for controlling the outcome of the mixing process. By adjusting the mixing time (alone or together with the temperature), the properties of the combination of the ash and liquid (purification composition) may be adjusted in the mixing process.

In an embodiment, the amount of the ash comprises weight of the ash. The amount may be given in kilograms, for example. Also the amount of the liquid may comprise weight of the liquid and it may be given in kilograms as well. The use of the kilograms is illustrated in the example embodiments described above. The ash is weighted in the first step and based on the result, the other component(s), like the liquid, is/are combined with the ash. Then the other component(s) is/are also weighted to get the right amount(s) of component(s). A consistency of the ash may affect the weight. For example, a humidity of the ash may rise the weight.

In an embodiment, the amount of the ash and/or liquid comprises a volume. Then, for example, a cubic meter or a litter may be used as a unit when measuring and/or determining the amount of the ash and/or liquid.

In an embodiment, both the weight and volume are used when determining the amount of the ash and/or liquid in the purification composition. Also amount(s) of all other possible components may be given based on the weight and/or volume.

As described, the temperature of the combination of the ash and the liquid may be adjusted by adjusting the temperature of the liquid. A plurality of the temperature ranges may be used in the process depending on the desired outcome. Each of the range may be used to achieve desired (different) properties of the mixing and/or the combination of the ash and liquid. In an embodiment, the temperature of the combination of the ash and liquid is between 10-80 (plus) degrees.

In an embodiment, the temperature of the combination of the ash and liquid is preferably 18-25 degrees which may be the optimal temperature for the combination in many situations.

In an embodiment, the temperature of the combination of the ash and liquid is 10-30 degrees.

In an embodiment, the temperature of the combination of the ash and liquid is 30-60 degrees.

In an embodiment, the temperature of the combination of the ash and liquid is 60-80 degrees.

As described above, the temperature of the combination of the ash and liquid may be adjusted by adjusting the temperature of the liquid combined with the ash. Hence, the temperature of the ash may affect the temperature of the liquid combined with the ash. If the temperature of the ash is low (cold ash), then the temperature of the liquid added to the ash is high (warm/hot liquid), and respectively if the temperature of the ash is high (warm/hot ash), then the temperature of the liquid added to the ash is low (cold liquid) such that the temperature of the combination of the ash and liquid in both cases is between the limits, for example between 10-30 plus degrees. For example, the ash may be frozen, then the temperature of the liquid is adjusted to be so hot/worm that the temperature of the combination is in the limits. In another example, the ash may be hot (for example +80 degrees) and the temperature of the liquid is adjusted to be so cold that the temperature of the combination is in the limits.

In an embodiment, the temperature of the liquid may vary when feeding it to the ash. For example, the temperature of the liquid may be increased during the process when feeding the liquid to the ash (combining the liquid and ash) if it seems that temperature of the combination will stay too low, or the other way around. The temperature of the combination of the ash and liquid may be monitored when combining the ash and the liquid.

As described, in addition to the temperature, by adjusting the mixing time (alone or together with the temperature), the properties of the combination of the ash and liquid may be adjusted. A plurality of the mixing times may be used in the process depending on the desired outcome. Each of the mixing time may be used to achieve desired (different) properties of the mixing and/or the combination of the ash and liquid. In an embodiment, the mixing time is 10-120 minutes.

In an embodiment, the mixing time is 55-65 minutes which may be the optimum mixing time in many situations.

In an embodiment, the used mixing time is 10-40 minutes.

In an embodiment, the used mixing time is 40-90 minutes.

In an embodiment, the used mixing time is 90-120 minutes.

In an embodiment, the mixing of the ash and the liquid comprises a pump mixing. The pump mixing process comprises a pump which is used to spray the liquid through nozzles inside container (tank). Spraying of the liquid provides a mixing energy for mixing the ash and liquid together. Also other type of mixers may be used, for example, a blade mixer. A plurality of mixing methods may also be combined when mixing the ash and liquid.

In an embodiment, a pressure in the pump mixing is 0.01-3 bar.

In an embodiment, the pump mixing is configured to cause an abrasive effect for separating particles of the purification composition from each other. The abrasive effect may start the chemical reaction in the combination of the ash and liquid. The nozzles in the pump mixing and/or the pressure are selected such that the abrasive affect is achieved.

Figure 4:
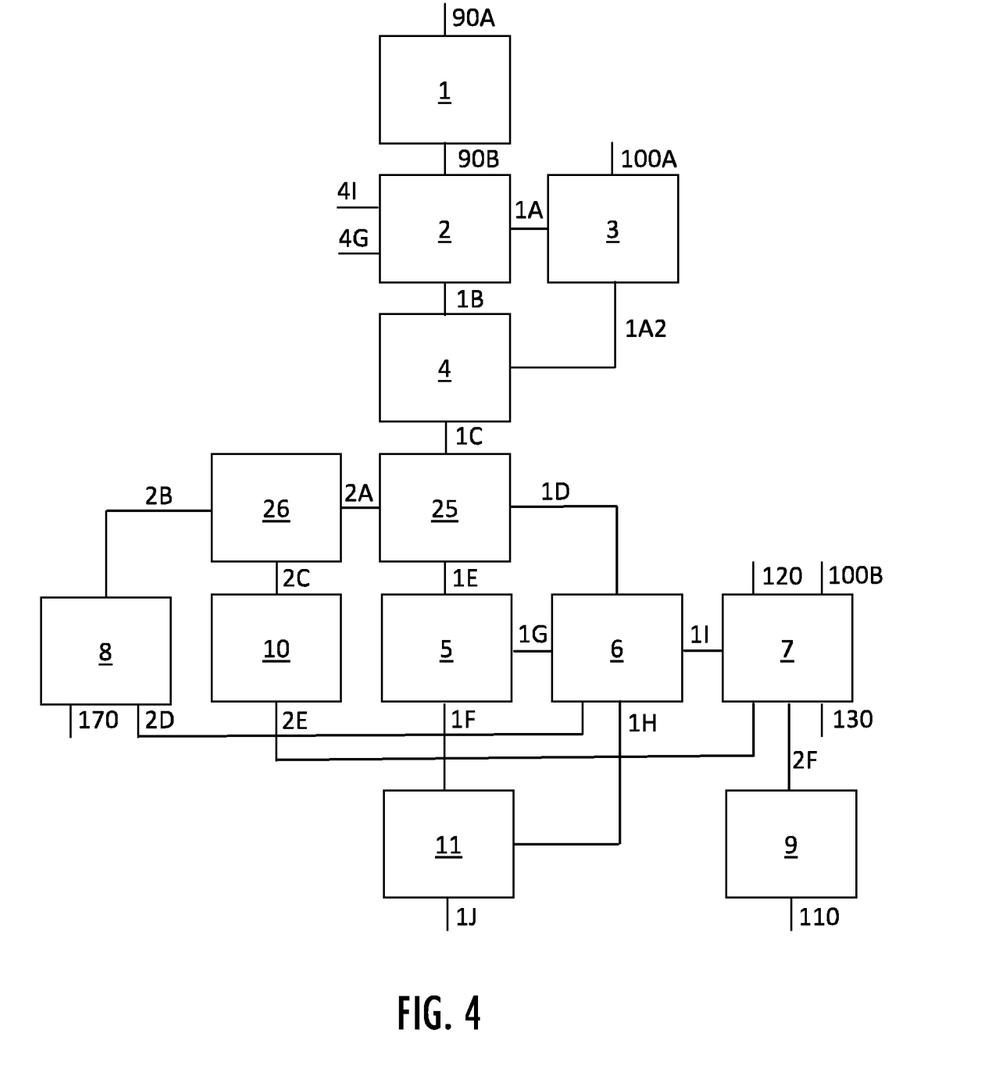
FIG. 4 illustrates a system for producing the purification composition according to an embodiment.

Referring to FIG. 4, wherein a system for producing the purification composition is illustrated according to an embodiment. The ash may be fed via line 90A into a container 1 in which the amount of the ash is measured. The ash may be weighted in the container 1, for example. Also the amount of the ash combined with the liquid is determined, in other words, the amount of the ash going to be processed and fed further in the system. All or just a part of the measured ash may be combined with the liquid. The leftover part of the ash in the container 1 may be used later, for example, when producing the next batch of the purification composition. In an embodiment, the leftover part of the ash may be removed from the container 1, for example, via line 90A.

In an embodiment, the ash going to be combined with the liquid is fed via line 90B into a second container 2. The liquid is led from a container 3 via line 1A into the same container 2, wherein the ash and liquid are combined. As described above, the temperature of the combination of the ash and liquid may be adjusted by adjusting the temperature of the liquid. The temperature of the liquid may be controlled in the container 3 and fed into the container 2 when the temperature is according to the process requirements (within the limits). The temperature of the combination of the ash and liquid may also be monitored in the container 2 to ensure that the temperature is within the limits.

In an embodiment, when the temperature of the combination of the ash and liquid is in the limits, for example, between 10-30 degrees, the ash and liquid may mixed in the container 2 by the pump mixing. The container 2 may comprise the pump mixer. The mixing time may be, for example, 55-65 minutes. The mixed ash and liquid may form a base for the purification composition.

In an embodiment, the purification composition is fed from the container 2 into a container 4 through a feeding line 1B in which the composition get stabilized. Also air formed in the mixing process may leave the composition. A chemical separation may take place in the container 4. The separation of the purification composition may start in the container 4 when heaviest particles of a mass of the purification composition sink to a bottom of the container. The composition may be almost particle free on a surface level when the mass settles to the bottom. The particle free composition may also be used for washing the container 4 when removing it and hence, a need for separate washing of the container reduces. In other words, the removal of the particle free composition from the container pre-washes the container. The container 4 may not be pressurized.

In an embodiment, the composition is fed from the container 4 into a container 25 via feeding line 1C. The container 25 may operate as a (main) separation unit for the composition, nevertheless the separation may be started already in the container 4. The mass portion of the purification composition is separated in the container. Like in the container 4, the mass portion of the purification composition sinks to the bottom of the container and, hence is separated from the purification composition. Also many known separation solutions may be applied to enhance the process. For example, a belt filter press, a decanter centrifuge and/or other techniques based on a centrifugal force may be applied. The container 25 may be pressurized.

In an embodiment, the separated mass portion is fed into a container 26 via line 2A wherein the mass portion is further separated into two parts. One part is led into a container 8 via line 2B. This first part of the mass portion may be taken out of the container 8 via line 170 and can be used as a product in some certain solutions. Another (second) part of the mass portion may be further processed and may be fed from the container 26 into a container 10 via line 2C.

In an embodiment, the container 4 is used for separating the purification composition. Hence, the container 25 which is the main separation unit may not be used in the system. Then the container 4 may have same properties as the container 25 (described above) and is used like the container 25.

In an embodiment, the mass portion is fed from the container 10 into a container 7 via line 2E. Metals may be separated (removed) from the mass fraction in the container 7. Liquid is added into the container 7 from line 100B and an electricity via line 120. Many of the known separation techniques may be applied in the inventions for separating the metals, for example, lowering of pH by using acid (solutions) and a reverse osmose may be applied in the separation. The liquid is led out of the container 7 via line 130. The liquid may be transferred, for example, to a water treatment unit for purification wherein different components are separated from the liquid like, for example, detrimental elements which are dissolved into the liquid from the mass portion. The purified liquid may be recycled and used again in the process. The separated metals are led from the container 7 into a container 9 via line 2F wherefrom they may be taken out of the process via a line 110 for further processing.

In an embodiment, the purification composition from which the mass portion is separated in the container 25 is fed into a container 5 via line 1E for further processing. In the processing, remaining mass portion of the purification composition is separated and after processing, the purification composition will get its final form. The separation may performed same way like in the containers 4 and/or 25 described above. The finished purification composition is received from the process. About 50% of the purification composition fed into the container 25 is received as a finished product after separation processing and this part is led from the container 5 into a container 11 via line 1F.

In an embodiment, the non-finished part (other 50% of the composition) of the purification composition that is still not finished product is fed from the container 5 into a container 6 via line 1G for further processing. The non-finished part of the composition still comprises too much mass (fine mass) which will be separated in the process. The process(es) for separating the mass from the composition may be same as described above. The finished product is fed from the container 6 into the container 11 via line 1H, where already is stored the first finished part of the purification composition (first 50%) received from the container 5. The separated fine mass is fed into the container 8 via line 2D. In some cases, the fine mass may also fed into the container 7 via line 1I for further processing. The process performed in the container 7 is described above in this application. After processing, the finished purification composition is led into the container 6 via line 1I and further into the container 11 via line 1H.

In an embodiment, a part of the purification composition is fed from the container 6 back into the container 25 via feeding line 1D for washing (cleaning) the container. Hence, the purification composition is used also for washing the containers in the system. In an embodiment, a content of the containers 3 and 4 may be transferred via line 1A2.

In an embodiment, the purification composition manufacturing process start again when the ash, or at least part of it, is transferred from the container 1 into the container 2. In other words, when the first batch of the ash is measured in the container 1 and transferred into the container 2 for further processing, the second batch of the ash is fed into the container 1 for measuring and so on. It is possible that a part of the ash measured in the container 1 is not fed into the container 2 and this leftover ash is used in the next batch. The manufacturing process may be a nonstop-process in which a plurality of the production batches may be processed at the same time.

Figure 3A:
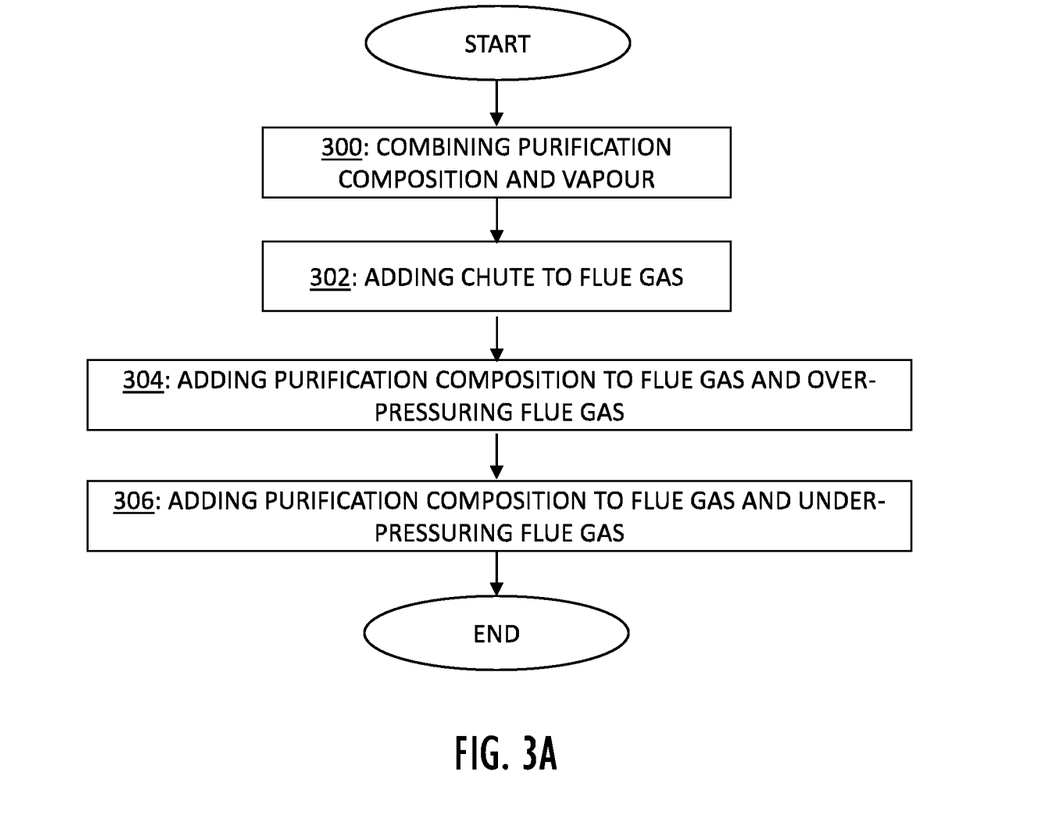
FIGS. 3A, 3B, 3C and 3D illustrate flow charts of methods for using the purification composition in purification of flue gas according to an embodiment.

Referring to FIG. 3A, in an embodiment, a method for purifying the flue gas by the purification composition comprising: (block 300) combining the purification composition and vapour to form a chute, (block 302) adding the chute to the flue gas, (block 304) adding the purification composition to the flue gas and over-pressuring the flue gas and (block 306) adding more of the purification composition to the flue gas and under-pressuring the flue gas.

In an embodiment, the method for purifying the flue gas by the purification composition comprises a step of forming the chute. The chute is formed by combining the purification composition and the vapour (steam). The chute may be formed in a container wherein the purification composition and vapour are fed and combined. The purification composition may already be in the container to which the vapour is added, or the other way around, the vapour is in the container to which the purification composition is added. In an embodiment, the purification composition and vapour are mixed when forming the chute. A composition of the chute is a vapour-like, in other words, it is like the vapour comprising the purification composition.

In an embodiment, the chute is added to the flue gas. This may take place in a different container where the chute is formed. Hence, the chute is fed into another container where it is combined with the flue gas. The flue gas may be already be in the container to which the chute is added or the other way around, the chute is in the container when the flue gas is added. In an embodiment, the chute and the flue gas are mixed to ensure a proper combination of them.

Particles of the flue gas as well as a unit weight of the flue gas may be enlarged by adding the chute to the flue gas. Combining the purification composition with the vapour, in other words the chute, enables adhesion of the purification composition with the particles of the flue gas. This adhesion enables enlargement of the particles and the unit weight of the flue gas such that the particles may be efficiently removed in a flue gas scrubber.

In an embodiment, after adding the chute to the flue gas, the purification composition may be added to the flue gas such that the flue gas may be over-pressurized. The flue gas may be over-pressurized before or after adding the purification composition. In other words, the flue gas may be over-pressurized already when adding the purification composition (added in the overpressure) or the flue gas with the added purification composition is over-pressurized after adding. The over-pressurization may adhere (nitrogen) gases of the flue gas to the liquid.

After adding the purification composition in over-pressurized state of the flue gas, more purification composition is added to the flue gas. Now the flue gas may be under-pressurized. The flue gas may be under-pressurized before or after adding more purification composition. In other words, the flue gas may be under-pressurized already when adding the purification composition (added in the under-pressure) or the flue gas with the added purification composition is under-pressurized after adding. The under-pressurization may separate the gases from the liquid.

In an embodiment, the chute and the flue gas are mixed when the chute is added to the flue gas in the over- and/or under-pressure. Many of the known mixing techniques may be used, for example, the techniques described in this application.

In an embodiment, combining the chute and/or the purification composition and flue gas is performed by a venturi scrubber (an ejector).

In an embodiment, combining of the chute and/or the purification composition and flue gas is performed by the ejector technique such that the flue gas is in rotational movement (cyclone) when combined with the chute. Shape of conduits in the system may be used to get the rotational movement for the flue gas.

In an embodiment, a pH-value of the flue gas may be raised near by the neutral by neutralizing an acidity of the flue gas with the chute and/or the purification composition.

In an embodiment, a sludge (waste liquid) is removed from the over- and/or under-pressurized flue gas. For example, the sludge may be led out of the container in which the over- and/or under-pressurization is performed.

Figure 3B:
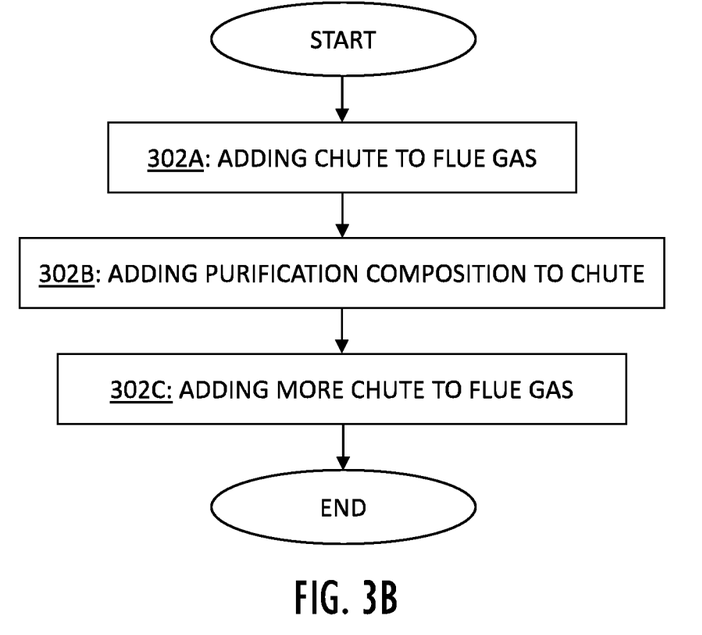
Figure 3C:
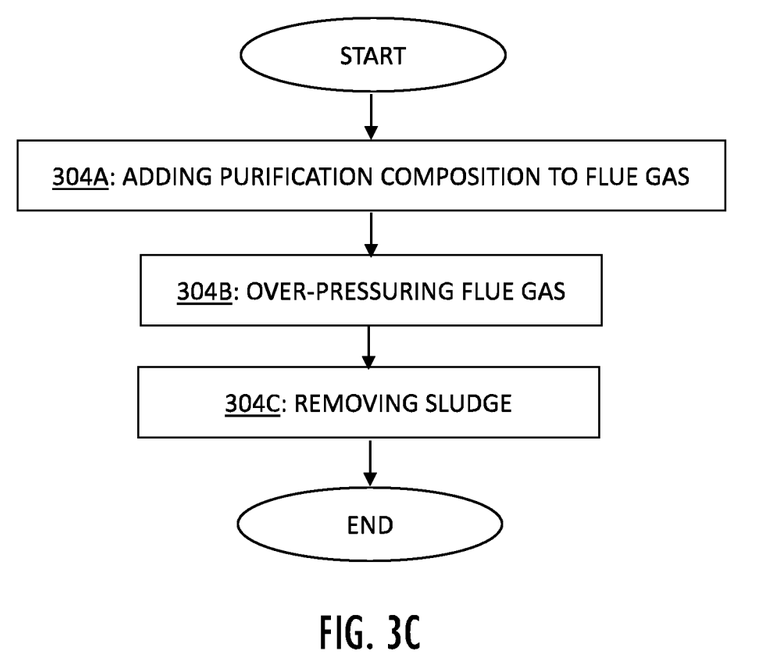

Referring to FIG. 3C, wherein the removal of the sludge is illustrated in a case of the over-pressurization of flue gas according to an embodiment. At first (block 304A) the purification composition is added to the flue gas, next (block 304B) the flue gas is over-pressurized and then (block 304C) the sludge is removed from the flue gas.

Figure 3D:
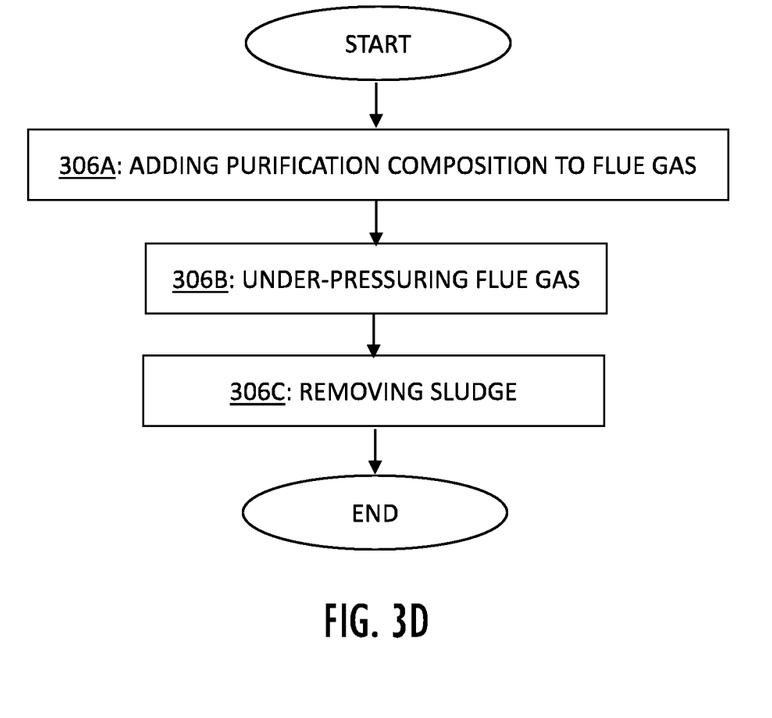

Referring to FIG. 3D, wherein the removal of the sludge is illustrated in a case of the over-pressurization of the flue gas according to an embodiment. At first (block 306A) the purification composition is added to the flue gas, next (block 306B) the flue gas is under-pressurized and then (block 306C) the sludge is removed from the flue gas.

In an embodiment, the vapour used for forming the chute with the purification composition comprises water vapour.

In an embodiment, the chute is added to the flue gas several times. It may be added more than one time, for example, two or three times.

In an embodiment, the purification composition is added to the chute after a first addition of the chute to the flue gas. If the chute is added, for example, two times to the flue gas, the purification composition may be added to the chute after the first adding but before the second adding. Hence, the chute may comprise more purification composition when added the second time to the flue gas. If the chute is added three time to the flue gas, the purification composition may be added to the chute after the first adding but before the second and/or third adding.

Referring to FIG. 3B, wherein the adding of the chute to the flue gas several times is illustrated. At first (block 302A) the chute is added to the flue gas, next (block 302B) the purification composition is added to the chute and then (block 302C) more chute is added to the flue gas after adding the purification composition to the chute. The process illustrated in FIG. 3B may be repeated more than one time.

In an embodiment, a temperature in the over- and/or under-pressure is 10-70 degrees. For example, a processing of carbon dioxides, separated from the flue gas, may affect the temperature of the over- and/or under-pressure. If the carbon dioxides are further processed, for example, into gas, the temperature range may be 20-60 degrees, for example.

In another embodiment, the temperature in the over- and/or under-pressure is 10-40 degrees. If the carbon dioxides are processed into a powder, the temperature range may be 20-30 degrees, for example.

In an embodiment, a temperature is different in the overpressure than it is in the under-pressure. The temperature in the overpressure may be higher than in the under-pressure or the other way around.

In an embodiment, a pressure in the over-pressurization is 1-10 bar. In another embodiment, the pressure is 1-6 bar.

In an embodiment, a pressure in the under-pressurization is maximum 1 bar.

The technique used for mixing of the chute and ash may affect the over- and under-pressure.

In an embodiment, each of the steps of the purification of the flue gas is performed in a different container. For example, all of the step illustrated in FIG. 3 (blocks 300-306) are performed in the different containers. In another embodiment, some of the mentioned steps are performed in the same container.

Figure 5:
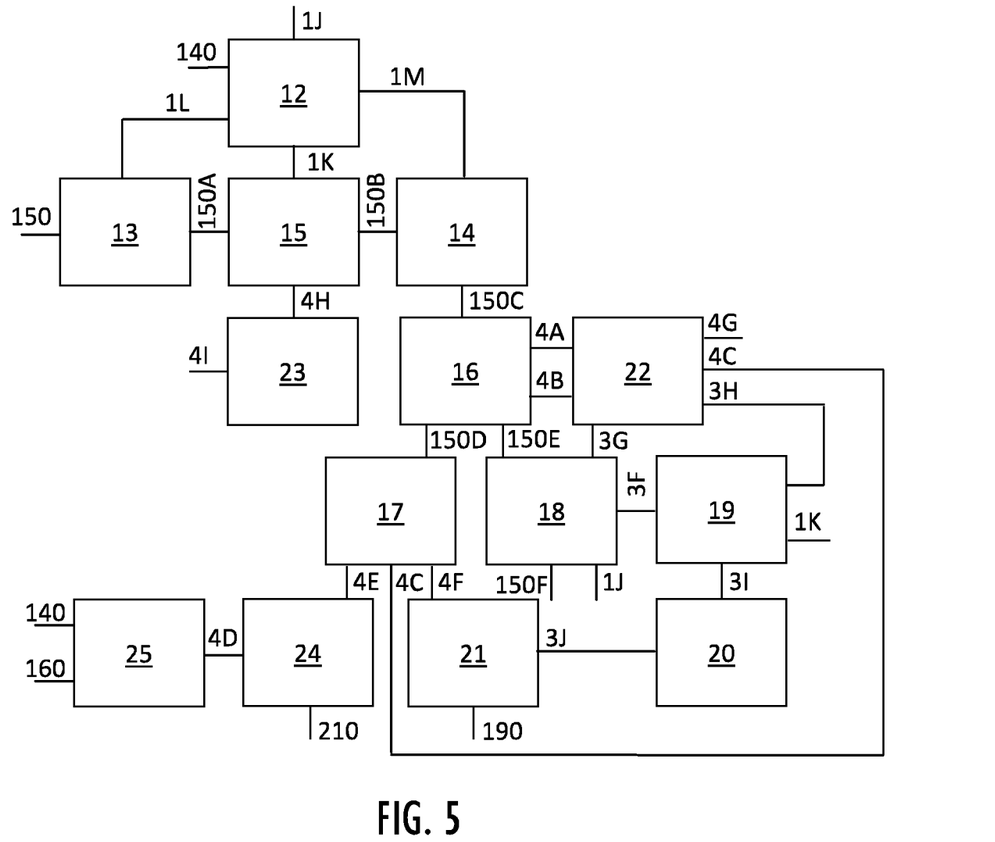
FIG. 5 illustrates a system for purifying the flue gas by the purification composition according to an embodiment.

Referring to FIG. 5, wherein a system for purifying the flue gas by the purification composition is illustrated according to an embodiment. The flue gas going to be purified by the purification composition is fed into a container 15 via line 150(A) in which the solid particles (like sulphur) are removed. Some of the smallest solid particles may still stay in the flue gas and hence, may not be removed. Then the flue gas may be washed with water by the flue gas grubber. The container 15 may comprise the flue gas grubber.

In an embodiment, the purification composition is led from the container 11 into a container 12 via line 1J and the vapour is fed into the same container 12 via line 140 for forming the chute. The chute is fed from the container 12 into a container 13 via line 1L. The flue gas is fed into the container 15, if it is not already there, via line 150A. The chute is fed into the same container 1 via line 1K in which the chute is first time added into the flue gas. After the adding the chute, the flue gas is fed into a container 14 via line 150B. The chute is also fed into the container 14 from the container 12 via line 1M, wherein the chute is added the second time into the flue gas. Adding of the chute neutralize the acidity of the flue gas which rises the pH value of the flue gas near by the neutral. The container 14 may be a secondary (post) flue gas grubber.

In an embodiment, the flue gas is fed from the container 14 into a heat exchanger 16 via line 150C. A condensate may be led via lines 4B and 4A into a container 22. A waste heat may be led from the heat exchanger into a heat pump 17 via line 150C. The heat pump may enhance an energy efficiency of the system. In an embodiment, the flue gas is fed from the heat exchanger 16 into a container 18 via line 150E. Also the purification composition is fed via line 1J into the same container 18 from the container 11. The container 18 is over-pressurized for adhering the gases into the liquid.

In an embodiment, after the over-pressurization, the flue gas is fed into a container 19 via line 3F and the sludge is led away from the container 18 via line 3G into a container 22. Also the purification composition is fed via line 1J into the same container 19 from the container 11. The container is under-pressurized for separating the gases from the liquid. The sludge is led away from the container 19 via line 3G into the container 22. The separated gases are led into a container 20 via line 31 in which the gases are liquidized and then led into a container 21 via line 3J.

In an embodiment, a heat transfer fluid(s) are also led from the heat pump into the container 21 via line 4F in which the gases are separated by changing the pressure and temperature, like described above on this application. The changes in the pressure may be performed via line 190.

In an embodiment, a condensation heat (condensate) is led from the container 22 into the heat pump 17 via line 4C. The highest heat(s) is/are led from the heat pump into a water tank 24 of a steam engine 25 via line 4E. Cold water is led into the water tank 24 via line 210. Pre-heated water (heated by heat from the heat pump) is fed into the steam engine via line 4D. A hot steam is fed into the steam engine 25 via line 140 providing the final heat. So the waste heat is used to rise the temperature of water in the tank 24 and a final temperature rise of the stem engine is performed by the steam got from the line 140. The steam engine may coupled with an electric generator configured to produce an electricity, wherein the produced electricity may be led out via line 160. The electricity may be led for sale, for example.

The sludge is led via line 4G from the container 22 into the container 2, wherein the ash is processed. The sludge generated in container 15 is fed into the container 23 via line 4H and from container 23 into the container 2 via line 4I.

In an embodiment, the heat of the flue gas is reduced about to 20 degrees by the heat exchanged 16. The recovered heat(s) is/are used for producing temperature differences needed in the process and also for the stem engine. The described process produces a cooling system for the process and the recovered heat produced by the process is used for producing energy (electricity).

In an embodiment, the purification liquid and condensate are applied in the processing of the ash.

In an embodiment, when the heat is recovered from the flue gas, the flue gas is fed back into the container 18 in which, for example, nitrogen, carbon oxide and other gases and solids are adhered into the purification composition and separated by using the temperature and pressure changes and fed into the container 19 (separation unit). From the container 19 the gases are fed into the container 20 (pressure unit) and from the container 20 into the container 21 (purification and separation unit). The sludge of the container 21 may be utilized as a raw material in the processing of the ash, for example, when producing fertiliser from the process.

In an embodiment, the (purified) flue gas is led out of the container 18 via line 150F.

By using the pressure and temperature differences, the nitrogen and carbon oxides are separated from each other.

In an embodiment, the purification composition may also be used for washing in the containers and other possible equipment in the different steps of the process. This reduces a need for separate washing liquid and hence, enhances the process, for example, from cost point of view.

There may be many steps in the described processes that are obvious to a person skilled in the art and hence, are not explicitly or at all described in this application that may still be a part of the process.

In an embodiment, the purification composition is used as a fertilizer.

In an embodiment, the purification composition is used for fertilizing.

In addition to the purification of the flue gas, the purification composition may be used as the fertiliser (nutrient solution) for different purposes. The purification composition according to the invention may not contain contaminants that are harmful, for example, for the plants, or at least not such amounts that may be harmful. The purification composition comprises still nutrients of the ash which are very useful as the fertilizer. Therefore, the manufacturing method of the purification composition may also be used for producing the fertilizer and the purification composition got from the process may also be used as fertilizer for the plants. The parameters or some of the parameters of the producing method of the purification composition may be adjusted differently when producing the purification composition for fertilizing purposes. The different mixing techniques, temperature and mixing time may be used. In an embodiment, the temperature of combination of the ash and liquid may be 10-30 degrees, preferably 19-23 degrees and the mixing time 55-65 minutes, preferably 60 minutes. For example, the blade mixing may be used when mixing the ash and liquid together when producing the fertilizer.

It will be obvious to the person skilled in the art that the processes and systems described in this application needs also power generator(s) and a plurality of different components that are not explicitly described in the application.

It will be obvious to the person skilled in the art that, as the technology advances, the inventive concept can be implemented in various ways. The invention and its embodiments are not limited to the examples described above but may vary within the scope of the claims.

The invention claimed is:

1. A method for producing a purification composition of flue gas, the method comprising:
   measuring an amount of ash;
   combining the ash and liquid, wherein an amount of the liquid is based on the amount of the ash;
   adjusting a temperature of the combination of the ash and the liquid by adjusting a temperature of the liquid;
   mixing, in a first container, the ash and the liquid; and
   separating, in a second container, a mass portion from the combination of the ash and the liquid, wherein particles of the mass portion sinks to a bottom of the second container and the combination of the ash and the liquid from which the mass portion is removed forms the purification composition.

2. The method of claim 1, wherein the temperature of the combination of the ash and the liquid is 10-80 degrees.

3. The method of claim 1, wherein a mixing time is 10-120 minutes.

4. The method of claim 1, wherein the mixing of the ash and the liquid comprises a pump mixing.

5. The method of claim 4, wherein a pressure of the pump mixing is 0.01-3 bar.

6. The method of claim 4, wherein the pump mixing is configured to cause an abrasive effect for separating particles of the purification composition from each other.

7. The method of claim 6, wherein the combination of the purification composition and the steam is added to the flue gas several times.

8. The method of claim 7, wherein more the purification composition is added to the combination of the purification composition and the steam after a first addition of the combination of the purification composition and the steam to the flue gas.

9. The method of claim 6, wherein a temperature in the over- and/or under-pressurizing is 10-70 degrees.

10. The method of claim 6, wherein a temperature in the over- and/or under-pressurizing is 10-40 degrees.

11. The method of claim 6, wherein an over-pressure is 1-10 bar.

12. The method of claim 6, wherein an under-pressure is maximum 1 bar.

13. A method for purifying a flue gas by a purification composition of claim 1, the method comprising:
  combining the purification composition and steam;
  adding the combination of the purification composition and the steam to the flue gas;
  adding the purification composition to the flue gas and over-pressuring the flue gas; and
  adding more of the purification composition to the flue gas and under-pressuring the flue gas.

14. The method of claim 13, wherein heat from the flue gas is used to produce a desired temperature in the over- and under-pressurization.

15. The method of claim 1, wherein heat from the ash raises the temperature of the combination of the ash and the liquid.

* * * * *